Figure 2:
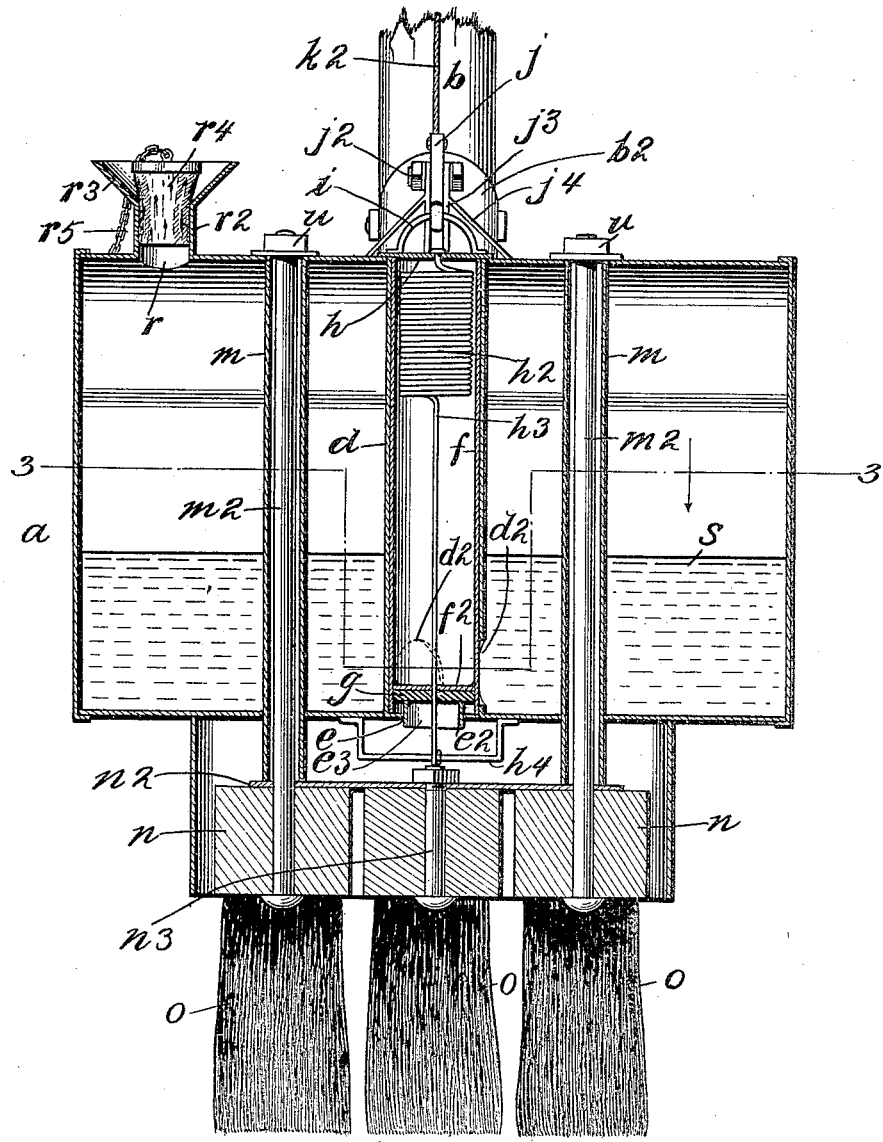

No. 816,765. PATENTED APR. 3, 1906.
A. WAGNER.
FOUNTAIN PAINT BRUSH.
APPLICATION FILED FEB. 5, 1904.
2 SHEETS—SHEET 1.
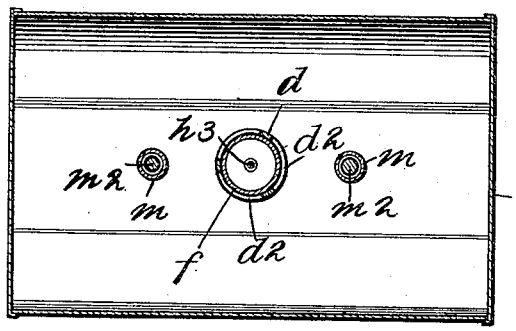
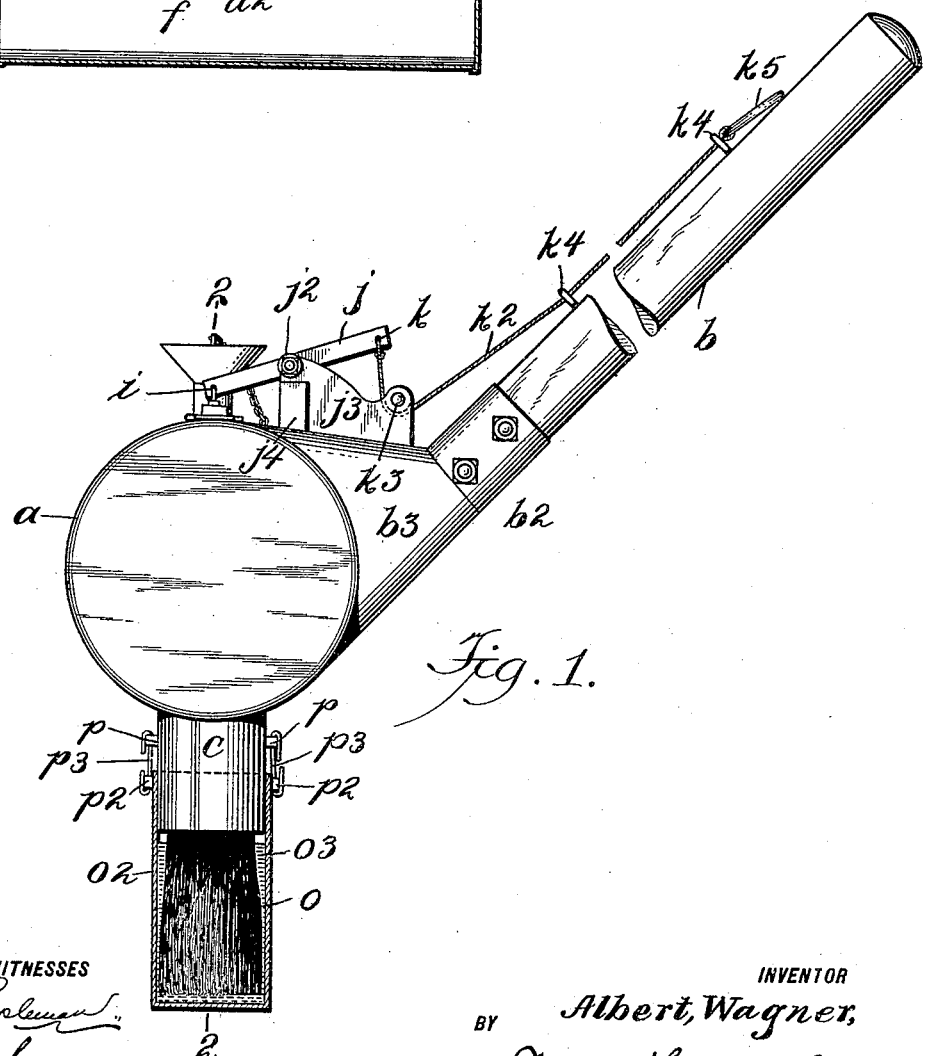
INVENTOR
Albert Wagner,
BY Edgar Tate & Co.
ATTORNEYS

UNITED STATES PATENT OFFICE.

ALBERT WAGNER, OF NEW YORK, N. Y.

FOUNTAIN PAINT-BRUSH.

No. 816,765.  Specification of Letters Patent.  Patented April 3, 1906.

Application filed February 5, 1904. Serial No. 192,069.

*To all whom it may concern:*

Be it known that I, ALBERT WAGNER, a citizen of the United States, residing at New York, in the county of New York and State of New York, have invented certain new and useful Improvements in Fountain Paint-Brushes, of which the following is a specification, such as will enable those skilled in the art to which it appertains to make and use the same.

The object of this invention is to provide an improved fountain paint-brush; and with this and other objects in view the invention consists in a brush of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view, partially in section, of my improved self-feeding paint-brush; Fig. 2, a central vertical section on the line 2 2 of Fig. 1 and on an enlarged scale, and Fig. 3 a section on the line 3 3 of Fig. 2 and on a smaller scale than said figure.

In the practice of my invention I provide a receptacle $a$, which is preferably cylindrical in form and provided with a handle $b$, which is secured in a sleeve $b^2$, connected with one side of the receptacle $a$, as shown at $b^3$, and which extends upwardly and outwardly from said receptacle.

The receptacle $a$ is provided at the bottom thereof with an oblong casing $c$, which is open at the bottom, and said receptacle is also provided with a central vertically-arranged main tube $d$, which opens through the top thereof and which extends to the bottom of said receptacle and is provided at its lower end with ports or passages $d^2$, one of which is shown in full and another in dotted lines in Fig. 2. Within the lower end of the tube $d$ the bottom portion of the receptacle $a$ is provided with an opening $e$, in which is secured a short tubular sleeve $e^2$, which forms a valve-seat and which also forms a port or passage $e^3$, and within the tube $d$ is a supplemental inner tube $f$, which extends the full length of said tube and which is provided near its lower end with a transverse member or plate $f^2$, to the bottom of which is secured a valve $g$, which is adapted to be seated on the valve-seat formed by the sleeve $e^2$ and to close the port or passage $e^3$.

The upper end of the tube $f$ is closed by or provided with a transverse member $h$, to which is secured a spiral spring $h^2$, the lower end of which is formed into a wire or rod $h^3$, which extends downwardly through the lower end of said sleeve and through the valve $g$ and is connected at its lower end with a bracket $h^4$, secured to the bottom of the receptacle $a$, and connected with the upper end of the tube $f$ is a loop or yoke $i$, with which is connected a lever $j$, which is pivoted at $j^2$ to an upright support $j^3$, connected with the top of the receptacle $a$ and having side braces $j^4$. The lever $j$ ranges transversely of the receptacle $a$, and connected with the outer end thereof at $k$ is a cord $k^2$, which is passed around a pulley at $k^3$, mounted in the support $j^3$, and passed through loops or eyes $k^4$, connected with the handle $b$, and provided at its end with a ring $k^5$.

Passing vertically through the casing $a$ at the opposite sides of the tube $d$ are small supplemental tubes $m$, which pass through the bottom of said casing, and I also provide a plurality of brush-heads $n$, which are connected with a plate $n^2$, and these brush-heads in the form of construction shown are three in number, and rods $m^2$ are passed downwardly through the supplemental tubes $m$ and through two of the brush-heads $n$, and the other or central brush-head $n$ is secured to the plate $n^2$ by a bolt $n^3$, and said brush-heads are provided with brushes $o$. I also provide a cap or cover $o^2$ for the brushes $o$, and this cap or cover is similar in form in and horizontal section to the casing $c$, and in practice the bottom of said casing is inserted into said cap or cover, as shown in Fig. 1, and said parts are connected by means of keepers $p$, secured to said casing, and corresponding keepers $p^2$, secured to said cap or cover, and through these keepers are passed flexible fastening devices $p^3$, the ends of which are bent around said keepers, so as to hold the cap or cover $o^2$ in position.

The object of the cap or cover $o^2$ is to protect the brushes $o$ and keep the same clean, and in practice this cap or cover is filled or partially filled with water, as shown at $o^3$, so as to keep said brushes soft when the latter are not in use.

The receptacle $a$ is also provided in the top thereof with an opening $r$, inclosed by a sleeve $r^2$, having a funnel-shaped top $r^3$, through which the receptacle $a$ may be filled or partially filled with paint, the paint being shown at $s$, and the filling-opening at $r$ may be closed by a cork or plug $r^4$, which in the form of construction shown is connected with the receptacle $a$ by a chain or other fastening device $r^5$.

In using this device the cap or cover $o^2$ is removed and the cord $k^2$ is pulled so as to operate the lever $j$ and raise the tube $f$, and this operation raises the valve $g$, and the paint in the receptacle $a$ flows out through the ports or passages $d^2$ and the port or passage $e^3$ and is distributed over the brushes $o$, and the device is manipulated by means of the handle $b$ to apply the paint in the usual manner.

The tube $f$ is normally held in its lowest position by the spring $h^2$, in which position the valve $g$ closes the port or passage $e^3$; but these parts may be operated as above described in order to discharge the oil from the receptacle $a$ whenever necessary.

My improved fountain paint-brush is simple in construction and operation and comparatively inexpensive, and changes in and modifications of the construction herein described may be made without departing from the spirit of my invention or sacrificing its advantages.

In the form of construction shown the bolts or rods $m^2$ are provided at their upper ends with nuts $u$, and the brushes are held in place by means of said bolts or rods and said nuts, and by removing said nuts the brushes may be detached and cleaned or new brushes substituted whenever necessary.

Having fully described my invention, what I claim as new, and desire to secure by Letters Patent, is—

In a fountain paint-brush, a receptacle provided in the bottom thereof with a port or passage, a casing secured to said receptacle and inclosing said port or passage and open at the bottom, tubes passing through said receptacle and into said casing, brushes mounted in said casing and held therein by rods passing through said tubes, and means for feeding paint through said port or passage onto said brushes, substantially as shown and described.

In testimony that I claim the foregoing as my invention I have signed my name, in presence of the subscribing witnesses, this 3d day of February, 1904

ALBERT WAGNER.

Witnesses:
F. A. STEWART,
C. J. KLEIN.